(No Model.) 2 Sheets—Sheet 1.
G. H. COLE.
MECHANICAL OILER FOR SHAFTING.
No. 515,749. Patented Mar. 6, 1894.
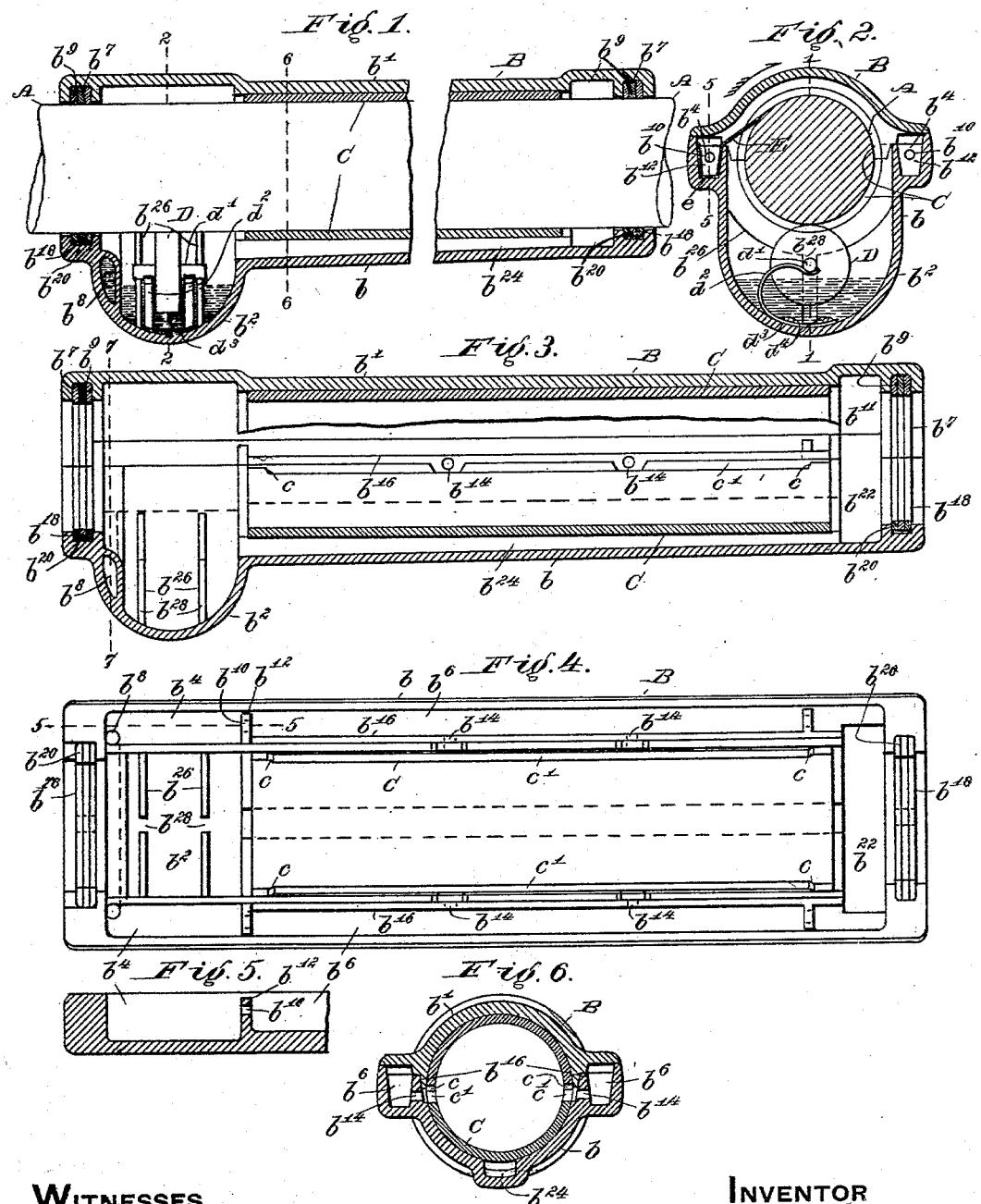
Witnesses.
Kirkley J Hyde.
Nellie C. Clifford.
Inventor
George H. Cole,
By Albert M. Moore,
His Attorney.

(No Model.) 2 Sheets—Sheet 2.
G. H. COLE.
MECHANICAL OILER FOR SHAFTING.
No. 515,749. Patented Mar. 6, 1894.
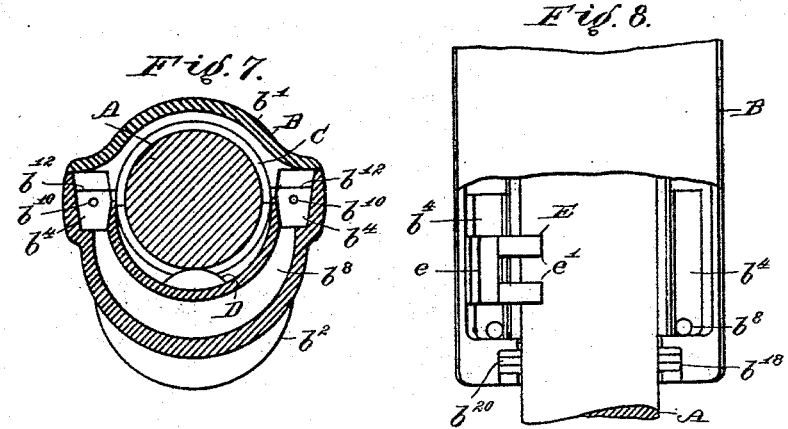
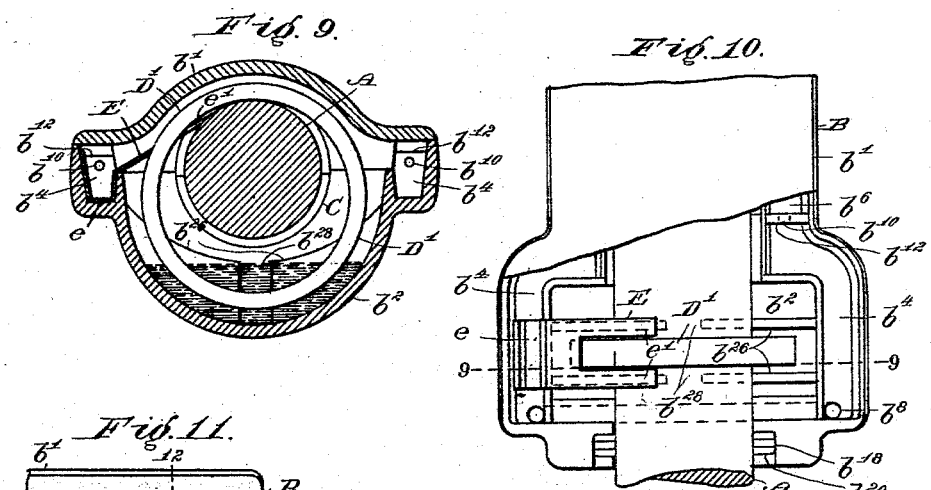
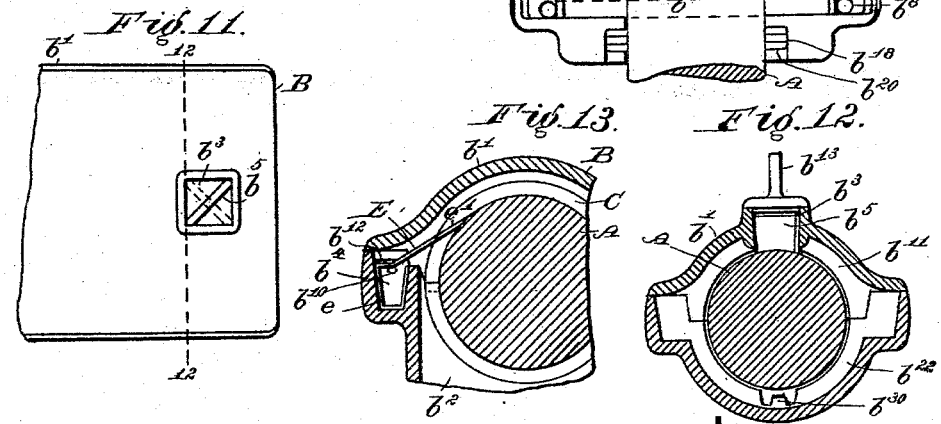
WITNESSES.
Kirkley Hyde.
Nellie C. Clifford.
INVENTOR
George H. Cole,
BY Albert M. Moore,
His ATTORNEY.

UNITED STATES PATENT OFFICE.

GEORGE H. COLE, OF LOWELL, MASSACHUSETTS.

MECHANICAL OILER FOR SHAFTING.

SPECIFICATION forming part of Letters Patent No. 515,749, dated March 6, 1894.

Application filed January 25, 1893. Serial No. 459,654. (No model.)

*To all whom it may concern:*

Be it known that I, GEORGE H. COLE, a citizen of the United States, residing at Lowell, in the county of Middlesex and Commonwealth of Massachusetts, have invented a certain new and useful Improvement in Mechanical Oilers for Shafting, of which the following is a specification.

My invention relates to mechanical oilers for shafting, and consists in the devices and combinations hereinafter described and claimed, whereby oil is raised from a reservoir, with which the journal-box is provided, to the shaft, and is thence removed to channels which convey said oil along the entire length of the bearing surface of the shaft.

In the accompanying drawings on two sheets, Figure 1 is a vertical longitudinal section on the line 1 1 in Fig. 2, of a journal-box having my improved devices for oiling a shaft, showing in front elevation a piece of shafting supported in said journal-box; Fig. 2, a vertical cross-section on the line 2 2 in Fig. 1; Fig. 3, like Fig. 1, except that the shaft, oil-raising roll and its supporting springs are omitted and a part of the anti-friction lining of the upper half of the box is broken away; Fig. 4, a plan of the lower half of the journal-box; Fig. 5, a vertical longitudinal section on the line 5 5 in Fig. 4, of a part of the lower half of the journal-box, showing a receiving-channel and the adjacent parts of a distributing channel; Fig. 6, a vertical cross-section of the journal-box, on the line 6 6 in Fig. 1, omitting the shaft; Fig. 7, a vertical cross-section on the line 7 7 in Fig. 3, omitting the shaft; Fig. 8, a plan of a part of the journal-box at the reservoir end, with a piece of shafting contained therein, a part of the upper half of the journal-box being removed to show the wiper; Figs. 9 and 10, showing a ring loosely surrounding the shaft and supported thereon and dipping into the oil, said ring being a substitute for the oil-raising roll, shown in Figs. 1, 2 and 7; Fig. 9 being a vertical cross-section on the line 9 9 in Fig. 10, and Fig. 10 being substantially like Fig. 8, except that, the ring being substituted for the roll, the reservoir part of the journal-box is necessarily made broader; Fig. 11, a plan of a part of the cap or upper member of the journal-box, showing the deflector and the hole in said cap which receives said deflector; Fig. 12, a vertical section on the line 12 12 in Fig. 11 of the journal-box and shaft, showing a side elevation of the deflector and its cover; Fig. 13, a vertical cross-section of a part of the journal-box and shaft, showing a slightly modified form of the wiper shown in Fig. 2.

A is a shaft of ordinary construction. The shaft A is supported in a journal-box B, formed in two parts, the lower part or pillow $b$ having at one end an enlargement $b^2$, which serves as a reservoir to hold a considerable quantity of oil or other liquid lubricant, and having at its upper edges channels $b^4$ to receive said oil, and other channels $b^6$ to distribute the oil along the journal of the shaft A. The receiving channels, or oil-receivers $b^4$, are arranged on opposite sides of the reservoir $b^2$ (see Figs. 4, 5, 7, 9 and 12), and are connected to each other by an equalizing passage $b^8$, by which the oil remains at the same height in both receivers. After the receivers $b^4$ are sufficiently filled, the oil runs from them through holes $b^{10}$ in gates or partitions $b^{12}$ which separate said receivers from the distributing channels $b^6$ into said receiving channels, and by the latter are conducted along the opposite sides of the journal of the shaft. The size of the holes $b^{10}$ regulates the flow of oil to the journal of the shaft and tends to keep said flow uniform.

From the distributing channels $b^6$ the oil runs through holes $b^{14}$ through the inner walls of said channels to the journal of the shaft A, said wall being thinned for this purpose at $b^{16}$. The number of these holes may be varied to suit the requirements of circumstances.

The babbitting or lining C of the lower half of the journal-box is omitted or cut away on each side at the top at $c$ to form an accumulating space $c'$ for the oil.

The cap $b'$ or upper half of the journal-box B is of a suitable shape to fit the lower, and is otherwise substantially of the usual form, except that said cap is provided with a hole $b^3$ near the end farthest from the reservoir, in which may be inserted a deflector $b^5$ consisting of a sheet of leatheroid, leather or metal, arranged diagonally of said hole $b^3$, as shown in Figs. 11 and 12, and loose enough to rest upon the shaft and to sink by its own weight in said hole as the under surface of said deflector is worn away, said deflector being set in such a manner that the upper surface of the shaft approaches the side of the deflector farthest from the adjacent end of the journal-box, so as to deflect any oil on the surface of the shaft toward the middle of said journal-box; except also that said cap is provided with a curved groove $b^7$ continuous with a similar groove $b^{18}$ in the lower part of the journal-box, there being such grooves at each end of the journal-box filled with strips of paper, leather, or similar material $b^9$ $b^{20}$ to absorb any oil on the shaft at the ends of the journal-box and to prevent the escape of oil from the journal-box.

The journal-box B has at the end farthest from the reservoir an annular groove $b^{11}$ $b^{22}$ which forms a drip-receiver for the usual purpose.

From the drip-receiver a return-passage $b^{24}$ leads back to the reservoir, said return-passage being slightly inclined toward said reservoir to carry back oil from the drip-receiver to said reservoir in a well-known manner.

Oil is raised from the reservoir $b^2$ either by an oil-raising roll D, shown in Figs. 1, 2 and 7, or by a ring D' which loosely surrounds the shaft and reaches down into the oil and is caused to rotate by friction on said shaft, both of these devices being old and not of my invention.

The oil-raising roll D is provided with a central shaft $d'$, the journals of which rest upon C-shaped springs $d^2$, or a forked spring, because the springs $d^2$ are preferably made in one piece, the connection between them being a foot $d^3$, (see Figs. 1 and 2) secured by screws $d^4$ to the bottom of the reservoir. The spring or springs $d^2$ hold the roll D with sufficient force against the under side of the shaft A to cause said roll to be rotated by friction on said shaft when the latter is rotated. The roll D runs between parallel guides $b^{26}$, arranged at right angles to the axis of said roll in the bottom of the reservoir $b^2$, the shaft $d'$ of said roll running in vertical notches $b^{28}$ in said guides, said notches preventing the shaft of said roll from running off from the springs $d^2$, and said guides preventing too great a disturbance of the oil in the reservoir and a forcing of the oil through the adjacent end of the journal-box. The notches $b^{28}$ are extended to the inside of the bottom of the reservoir $d^2$, to admit the oil between said guides, and these guides are used with the ring D' when said ring is substituted for the roll D.

By the use of the roll D or the ring D' the oil is carried up on to the shaft and runs around the shaft in two parallel rings. From said shaft A the oil is taken and conducted to the receivers $b^4$ by means of a forked wiper E, the points of which rest upon the top of the shaft, the other end of said wiper being secured in one of the oil-receivers $b^4$, the end of said wiper being bent at $e$ to fit one of said oil-receivers, as shown in Figs. 2, 9 and 13, the material of which the wiper is made being sheet metal of sufficient elasticity to be retained in said oil-receiver by a friction on the walls thereof, the points $e'$ of said fork when the ring D' is used having a running fit on said ring. By giving to the attaching end of the wiper the form shown in Fig. 13, said wiper may be used with the shaft rotating in either direction, the oil from the shaft approaching the forked-end of the wiper running down on the inclined upper surface of the wiper and the oil from the shaft when the fork trails on the shaft running down on the inclined under side of the wiper.

By the means above described, a current of oil is kept continually in motion through the journal-box and the journal of the shaft A is supported upon a film of oil.

Dust and lint are excluded from the journal-box by the strips $b^9$ $b^{20}$ and by a cover $b^{13}$ arranged over the rectangular hole $b^3$. The strips $b^9$ may be prevented from any movement caused by friction of the shaft A by a stop or upward projection $b^{30}$ (see Fig. 12) in the bottom of the groove $b^{22}$, which enters corresponding notches in said strips. If desired, similar stops may be used to prevent the movement of the strips $b^{20}$, but this will not ordinarily be found necessary because these strips cannot be carried around with the shaft without moving the strips $b^9$.

I claim as my invention—

1. The journal-box, having a reservoir, two oil-receivers, arranged on opposite sides of said reservoir, distributing channels, openings from said channels into the supporting surface or shaft-chamber of said journal-box and an equalizing passage connecting said oil-receivers to maintain the oil at an equal height in each of said receivers, and to apply oil equally to opposite sides of a shaft running in said journal-box, as and for the purpose specified.

2. The combination with a journal-box, having a reservoir, an oil-receiver, a distributing channel leading from said receiver, and opening from said channel to the supporting surface or shaft-chamber of said journal-box, of an oil-raising device, adapted to be operated by a shaft supported in said journal-box and to raise oil to said shaft, and a wiper resting at one end directly upon said shaft and thence inclined downward and reaching into said oil-receiver to conduct oil from said shaft into said oil-receiver, as and for the purpose specified.

3. The combination with a journal-box, having an oil-receiver and a channel to convey oil to the journal of a shaft and having a reservoir, of an oil-raising device operated by said shaft to raise oil to said shaft, and a wiper, having one end shaped to enter and fit said receiver and to be retained by friction therein, the other end of said wiper being adapted to rest on said shaft and to conduct oil therefrom to said oil receiver, as and for the purpose specified.

In witness whereof I have signed this specification, in the presence of two attesting witnesses, this 4th day of January, A. D. 1893.

GEORGE H. COLE.

Witnesses:
ALBERT M. MOORE,
MYRTIE C. MANSUR.